(No Model.)

W. P. LEFAVOUR.
SHAVING BRUSH.

No. 422,085. Patented Feb. 25, 1890.

Witnesses.
Selma R. Schelin.
Geo. W. White.

Inventor.
Woodbury P. Lefavour
by Alban Andrew, his atty.

UNITED STATES PATENT OFFICE.

WOODBURY P. LEFAVOUR, OF BEVERLY, MASSACHUSETTS.

SHAVING-BRUSH.

SPECIFICATION forming part of Letters Patent No. 422,085, dated February 25, 1890.

Application filed March 14, 1889. Serial No. 303,237. (No model.)

*To all whom it may concern:*

Be it known that I, WOODBURY P. LEFAVOUR, a citizen of the United States, and a resident of Beverly, in the county of Essex and State of Massachusetts, have invented new and useful Improvements in Shaving-Brushes, of which the following, taken in connection with the accompanying drawings, is a specification.

This invention relates to improvements in shaving-brushes, and it is carried out as follows, reference being had to the accompanying drawings, wherein—

Figure 1:
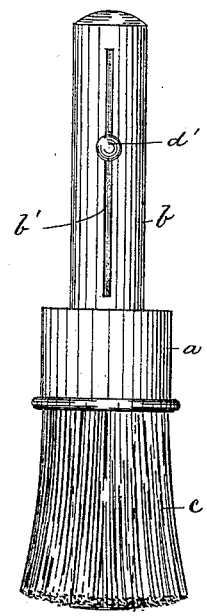
Figure 2:
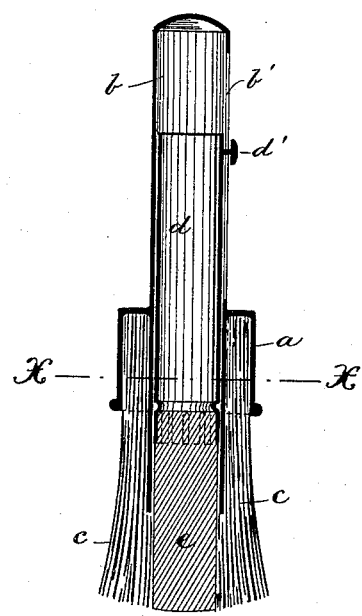
Figure 3:
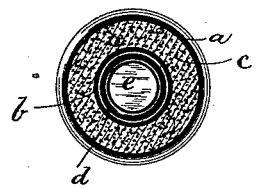

Figure 1 represents a side elevation, and Fig. 2 a central longitudinal section, of the improved shaving-brush. Fig. 3 represents a cross-section on the line X X, shown in Fig. 2.

Similar letters refer to similar parts wherever they occur on the drawings.

The object of my invention is to combine with a shaving-brush a soap-stick and longitudinally-adjustable soap-holder arranged centrally within the brush and its handle, so as to produce a lather on the face simply by dipping the brush in water and brushing it against the face without the need of rubbing the brush on a cake of soap, as is generally done, thus providing a quick, simple, and ready means for lathering the face preparatory to shaving the beard.

$a$ is the brush-ferrule, to which is secured in a suitable manner the hollow tubular handle $b$, as shown.

$c$ are the bristles, secured in a suitable manner within the ferrule $a$, said bristles being arranged in the form of an annular ring surrounding the lower portion of the tube $b$, as shown in Figs. 2 and 3.

Within the tube $b$ is arranged the longitudinally-adjustable soap-holder $d$, and to the lower end of the latter is secured the stick of shaving-soap $e$, as shown in Figs. 2 and 3. The lower end of the soap-holder is preferably slitted, as shown in dotted lines in Fig. 2, so as to cause the shaving-stick $e$ to be secured and held in position relative to said soap-holder.

$b'$ is a slot or elongated perforation in the side of the tubular handle $b$, and through it projects a pin provided with a knob or projection $d'$, that is secured in a suitable manner to the soap-holder $d$, as shown in Figs. 1 and 2, and by means of such knob the soap-holder and soap-stick can be adjusted up and down within the handle $b$.

When the brush is to be used for shaving purposes, the soap-stick $e$ is moved downward by means of the knob $d'$ and soap-holder $d$ to or about the position shown in Fig. 2, after which the brush is dipped in water, as usual, and rubbed against the face, thus causing a lather to be produced by the soap-stick arranged in the center of the bristles, as above mentioned.

When not desired for use, the soap-holder and soap-stick are moved upward sufficiently to cause the soap to be protected and covered by the lower part of the handle-tube $b$.

The invention is very simple in construction and operation, by its use a great saving of time is obtained, and it provides a shaving-brush always ready for applying soap to the face in a neat and efficient manner without the need of a shaving-cup or independent soap-cake.

I wish to state that I do not confine myself to the precise construction and arrangement of parts as shown in the drawings, as such may be changed or modified without departing from the essence of my invention; but What I wish to secure by Letters Patent, and claim, is—

The improved shaving-brush as described, consisting of the hollow handle $b$, having its lower end extended within the bristles and adapted to serve as a shield for the soap, the ferrule $a$, and annular bristles $c$, arranged between said ferrule and the lower part of the tube $b$, in combination with the tube $d$, arranged to slide up and down within the handle $b$ and having secured to its lower end the soap-stick $e$, substantially in a manner and for the purpose set forth.

In testimony whereof I have signed my name to this specification, in the presence of two subscribing witnesses, on this 8th day of March, A. D. 1889.

WOODBURY P. LEFAVOUR.

Witnesses:
ALBAN ANDRÉN,
CARL A. ANDRÉN.